(12) United States Patent
Ohlmer et al.

(10) Patent No.: US 8,787,493 B2
(45) Date of Patent: Jul. 22, 2014

(54) PRECODING TECHNIQUE

(75) Inventors: Eckhard Ohlmer, Dresden (DE); Udo Wachsmann, Schwabach (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/817,604

(22) PCT Filed: Aug. 12, 2011

(86) PCT No.: PCT/EP2011/004079
§ 371 (c)(1),
(2), (4) Date: Feb. 19, 2013

(87) PCT Pub. No.: WO2012/019781
PCT Pub. Date: Feb. 16, 2012

(65) Prior Publication Data
US 2013/0188751 A1    Jul. 25, 2013

Related U.S. Application Data

(60) Provisional application No. 61/373,095, filed on Aug. 12, 2010.

(51) Int. Cl.
*H04L 25/49*    (2006.01)
(52) U.S. Cl.
USPC ...... 375/296; 375/297; 455/114.2; 455/114.3
(58) Field of Classification Search
CPC .. H04B 7/0456; H04B 7/0639; H04B 7/0478; H04B 7/0619
USPC ..................... 375/296, 297; 455/114.2, 114.3
See application file for complete search history.

(56) References Cited

U.S. PATENT DOCUMENTS

| 2008/0159425 A1* | 7/2008 | Khojastepour et al. ........ 375/260 |
| 2009/0180454 A1* | 7/2009 | Au et al. ........................ 370/342 |
| 2009/0213945 A1* | 8/2009 | Cairns et al. .................. 375/260 |

OTHER PUBLICATIONS

Santipach, W. et al., "Capacity of a Multiple-Antenna Fading Channel With a Quantized Precoding Matrix", IEEE Transactions on Information Theory, Mar. 1, 2009, pp. 1218-1234, vol. 55, No. 3, XP11252632, IEEE Press, USA.

Lin, C. et al., "To Code or Not to Code Across Time: Space-Time Coding with Feedback", IEEE Journal on Selected Areas in Communications, Oct. 1, 2008, pp. 1588-1598, vol. 26, No. 8, XP 11236234, IEEE Service Center, Piscataway, USA.

Ohlmer, E. et al., "Mutual Information Maximizing Linear Precoding for Parallel Layer MIMO Detection", 2011 IEEE 12th International Workshop on Signal Processing Advances in Wireless Communications (SPAWC 2011), San Francisco, CA, USA, Jun. 26, 2011, pp. 346-350, XP 2660726, IEEE Service Center, Piscataway, USA.

(Continued)

*Primary Examiner* — Curtis Odom
(74) *Attorney, Agent, or Firm* — Coats and Bennett, P.L.L.C.

(57) ABSTRACT

A technique for precoding a signal to be transmitted over a physical channel from a sender to a receiver is provided. A method includes receiving precoding information and applying precoding matrix at the sender based on the precoding information. The precoding information is received via a feedback mechanism from the receiver. The application of the precoding matrix results in a precoded signal for transmission over the physical channel. The precoding matrix enhances mutual information at the receiver.

39 Claims, 8 Drawing Sheets

(56) References Cited

OTHER PUBLICATIONS

Ohlmer, E. et al., "Mutual Information of MIMO Transmission Over Correlated Channels with Finite Symbol Alphabets and Link Adaptation", Globecom 2010, 2010 IEEE Global Telecommunications Conference, Dec. 6, 2010, pp. 1-6, XP 31846327, IEEE Service Center, Piscataway, USA.

* cited by examiner

800

PRECODING TECHNIQUE

TECHNICAL FIELD

The present disclosure relates to a technique for preprocessing a signal to be transmitted. In particular, the disclosure relates to methods and devices for precoding a signal prior to transmission in mobile communications networks.

BACKGROUND

Mobile communication, including voice communication and data communication, has gained importance in everyday life and for business, as both data rates and coverage of radio networks steadily increase. At the same time, the technical challenges associated with reliably providing high data rates have increased.

A plurality of techniques for preprocessing a signal, such as methods of forward error correction, have been developed to improve the reliability of communication over noisy or stochastic channels. In the context of telecommunication networks, such as Long Term Evolution (LTE) networks, access may be provided via more than one stationary antenna. Under certain circumstances, precoding the signal can contribute to the reliability, the data rate or the coverage by exploiting at least one of spatial diversity and spatial multiplexing in radio communication.

SUMMARY

It is an object to provide a precoding technique that at least in certain scenarios improves one or both of data rate and reliability.

According to one aspect, a method of precoding a signal to be transmitted over a physical channel from a sender to a receiver is provided. The method comprises receiving precoding information by a feedback mechanism from the receiver; and applying a precoding matrix at the sender based on the precoding information resulting in a precoded signal for transmission over the physical channel, the precoding matrix enhancing mutual information at the receiver.

The precoding matrix (also denoted by W) may be chosen such that the mutual information (also denoted by MI, or I) at the receiver is enhanced. Enhancing the mutual information may include maximizing the mutual information or any other function that may be related to a detection metric. Mutual information may be maximized by means of a linear precoding. Enhancing or maximizing the mutual information may include improving or enhancing at least one of the data rate and the quality of a transmission system (e.g., a communications network) by means of the feedback mechanism. The data rate of the signal transmission over the physical channel may be enhanced.

The term "mutual information" may encompass a logarithm of a transition probability density function of the physical channel, or any other function thereof.

The precoding matrix may have a first dimension and a second dimension. The first dimension of the precoding matrix may correspond to a number of rows of the precoding matrix. The first dimension of the precoding matrix may be determined by a number of sending antennas, or a subset thereof. The sending antennas may also be referred to as transmit antennas. Alternatively or in addition, the second dimension of the precoding matrix may correspond to a number of columns of the precoding matrix. The second dimension of the precoding matrix may be determined by a number of transmission layers (e.g., spatial layers), also denoted by l, or a number of transmission channels. The precoding matrix may have only one row. Alternatively, the precoding matrix may have only one column.

The term precoding may encompass at least one of determining the precoding matrix and the application of the precoding matrix. The precoding matrix may be determined at the sender based on the precoding information. The precoding matrix may be applied at a sender side of a transmission system.

The precoding may use knowledge of the physical channel. The knowledge of the physical channel may include a channel state (denoted by H). The physical channel may be a channel between one or a plurality of sending antennas of the sender and one or a plurality of receiving antennas of the receiver. The channel state may be represented by a channel state matrix. The dimensionality of the channel state matrix may be determined by a number of sending antennas and a number of receiving antennas.

The precoding information may comprise, completely or partly, at least one of system information, the precoding matrix, and the mutual information. The system information may comprise, completely or partly, at least one of a state of the physical channel, statistics of the signal, and statistics of noise.

The precoding may be based on the system information. The system information may comprise the knowledge about the physical channel. The knowledge about the physical channel may have been measured or estimated. The precoding information may comprise information about at least one of a data symbol distribution (e.g., modulation schemes), the channel state, the noise variance and the Signal-to-Noise Ratio (SNR), amongst others.

Alternatively or in addition, the system information may comprise knowledge about statistical information about data symbols. The data symbols may constitute a symbol is alphabet. The knowledge about the data symbols may comprise knowledge about at least one of the data symbol alphabets and a data block probability distribution. The data block probability distribution may indicate a probability or a frequency of a certain data block or a certain data word. The data block probability distribution may represent a statistical distribution of data symbols within a data block. The probability distribution may comprise information about a symbol variance, a mutual dependency of symbols within a data block or a data word, and a mutual dependency of the plurality of payload symbols (also referred to as payload signals). The data block may be a single data word or include multiple data words. As understood herein, a data word may be encoded (i.e., may be an encoded data word, or code word). There may exist a mapping between data words and transmission layers and/or between transmission layers and antennas.

Alternatively or in addition, the system information may comprise statistical knowledge about an additive noise (also denoted by v). The additive noise may be caused by at least one of interference with other radio signals and receiver noise. The statistical knowledge about an additive noise may comprise the second momentum of the noise.

The physical channel may comprise the plurality of sending antennas. The signal may comprise the plurality of payload signals (also referred to as payload symbols). The payload signals or payload symbols may be mapped to the sending antennas by means of the precoding matrix.

The method may further comprise computing the precoding matrix. The precoding matrix may be computed in accordance with a detector at a receiver side. The detector may be a maximum likelihood detector or a suboptimal detector.

At the receiver side, the detector may be configured to decide which data words have been transmitted. As an example, the detector may comprise a function that assigns, to a received signal, a data word or symbol. Detection may thus be based on an assignment.

In the context of detection, an estimation function may be applied. The detector may thus be based on an estimator (e.g., the maximum likelihood detector may be based on a maximum likelihood estimator). At the receiver side, the estimator would yield a certain estimation error when estimating, e.g., modulation symbols based on the received signals. A covariance of the estimation error may be related to the gradient of the mutual information, which could be achieved by the detector. This relation may be employed for computing the precoding matrix.

The estimator may be a Minimum Mean Square Error estimator, or MMSE estimator. The MMSE estimator may be represented by a Minimum Mean Square Error matrix, or MMSE matrix. The MMSE matrix may be a tabulated representation or any other representation of the estimator. The estimation error may be represented by its covariance matrix, which is equal to the MMSE matrix if an MMSE estimator has been employed.

As stated above, the estimator may for a transmitted signal (also denoted by x), given the received signal (also denoted by y) and channel state information (also denoted by H), yield an estimation error (also denoted by E). The estimation error may include at least one of a covariance and the second momentum of the noise. In the case of a MMSE estimator, the estimation error may be a Mean Square Error (MSE). A MSE matrix may be a tabulated representation or any other representation of the estimation error. The MSE matrix may be a covariance matrix.

The precoding matrix may be computed in accordance with a detection metric. The precoding matrix may be computed based on at least one of the Minimum Mean Square Error matrix and the system information.

The physical channel may comprise a plurality of spatial layers that are successively detectable. The spatial layers may be successively detectable by removing interference of a previously detected layer from a transmitted signal.

The precoding may allow for parallel signal detection. The precoding matrix may be determined for a parallel decoding or a parallel detection of the data signals. The parallel decoding may comprise an independent decoding of the plurality of transmitted payload signals. The computing of the precoding matrix may take into account for the parallel decoding. The physical channel may comprise a plurality of spatial layers. The precoding matrix may be computed in accordance with a detection metric that decomposes in accordance with the plurality of spatial layers. At least one of the detection metric and the mutual information may be representable by a product or a sum over the plurality of spatial layers. The detection metric may be suboptimal. Determination or the decoding may comprise computing at least one of the mutual information per spatial layer and a gradient thereof with respect to the precoding matrix. The precoding matrix may be determined based on a relation between the gradient of the mutual information and the Minimum Mean Square Error matrix. The precoding matrix may allow for parallel decoding of the precoded signal at the receiver.

The determination of the precoding matrix W or the parallel decoding may comprise determining a reduced MSE matrix (also denoted by $E_l$) that is independent of the l-the transmission layer. The reduced MSE matrix may involve the MMSE estimator or MMSE matrix. The MMSE matrix involved in the reduced MSE matrix $E_l$ may be independent of the l-th transmission layer.

The signal may comprise a payload signal on each of the spatial layers. The precoding matrix may allow for independently decoding the plurality of payload signals. The mutual information may be representable by a sum over spatial layers of the difference between MI associated with an optimal detecting metric and MI given the l-th spatial layer input is known at the receiver.

In one implementation, the gradient of the mutual information may be computed in accordance with $$\nabla_w \overset{PLD}{I}(y; x) = \frac{1}{\sigma_v^2} H^H H W \left( \sum_{l=1}^{N_l} E - E_l \right)$$

The precoding matrix W may be computed completely at the receiver. Alternatively, the precoding matrix W may be computed completely at the sender. Still alternatively, the precoding matrix W may be computed partly at the receiver and partly at the sender.

Values of the precoding matrix W may be determined at the receiver (e.g., by means of the computation). The determination may be based on the precoding information. The precoding information may comprise at least one of the system information and the MMSE matrix. The precoding information may be transmitted to the sender. The precoding information may be transmitted over a dedicated feedback channel. The precoding information may include the values of the precoding matrix W themselves. Alternatively or in addition, the precoding information may include increment values with respect to previous values of the precoding matrix W.

Alternatively or in addition, the precoding information comprises values representing the system information or values representing increments of the system information. The precoding information may be transmitted to the sender (e.g., via the feedback channel). The sender may calculate the precoding matrix based on the precoding information.

Still alternatively or in further addition, the receiver may transmit (e.g., via the feedback channel) a part of the system information and a part of the MMSE matrix information. The computation of the precoding matrix may be completed at the sender.

At least one of the sender and the receiver may form, or be comprised in, the transmission system. The physical channel or the sender may comprise the plurality of sending antennas. Alternatively or in addition, the receiver may comprise the plurality of receiving antennas. The precoding may comprise a mapping of the plurality of transmission layers to the sending antennas by means of the precoding matrix W. The precoding matrix W may represent a beamforming matrix. The beamforming matrix may use the knowledge of the channel state H between the plurality of sending antennas and one or a plurality of receiving antennas. The beamforming matrix may be configured for a directional signal transmission.

The transmission system may comprise a plurality of physical channels. The plurality of physical channels may possibly exhibit each different channel states. For each channel state, a dedicated precoding matrix may be established and used for the transmission. The plurality of channel states may be associated with a plurality of sub-carriers (e.g. of an OFDM system).

The transmission system may be a radio communications network. The radio communications network may use at least one of Orthogonal Frequency Division Multiplexing (OFDM), Frequency Division Multiplexing (FDM), Time Division Multiplexing (TDM) and Code Division Multiplexing (CDMA), or any combination thereof.

According to a further aspect, a method of precoding a signal to be transmitted over a physical channel from a sender to a receiver is provided. The method comprises providing precoding information by a feedback mechanism to the sender; and receiving from the sender over the physical channel a signal precoded by a precoding matrix based on the system information, the precoding matrix enhancing mutual information at the receiver.

The precoding matrix W may be selected from an arbitrary codebook or a fixedly predefined codebook. The codebook may comprise a set of different precoding matrices $\{W_i\}$. The matrices $W_i$ may have been generated arbitrarily, for example in advance of operating the transmission system. A small codebook may facilitate a brute force selection of the mutual information maximizing precoding matrix within the codebook. Alternatively or in addition, the precoding matrix, which enhances or maximizes the mutual information, may have been computed based on any of the methods proposed herein.

The selection of the precoding matrix from the codebook may be based on a comparison with an optimal precoding matrix. The optimal precoding matrix may be a (computated) precoding matrix not limited to the codebook. The comparison may be based on a minimum distance criterion. As an example, the criterion may read $W=\min_i\|W_{opt}-W_i\|$.

The method may further comprise the step of creating the codebook. The creating step may involve decomposing the channel state (H). The decomposition may include a unitary matrix (also referred to as V). The precoding matrix may depend on the unitary matrix.

The codebook may be a structured codebook. The structured codebook may be optimized for the selection or may allow for simplified selection of precoding matrices. The codebook may exploit the structure of the optimal precoder.

The term "enhancing" mutual information may encompass maximizing the MI within the codebook. A precoding matrix maximizing the MI may be computed based on any of the methods proposed herein. The computation may be performed at the receiver.

The precoding matrix may be quantized. An overhead associated with feeding the precoding matrix back to the sender may thus be avoided. The quantized precoding matrix, or a quantized version thereof, may be any function of an optimal precoding matrix. The optimal precoding matrix is the precoding matrix that enhances (e.g., maximizes) the mutual information and may be derived according to the technique presented herein.

The quantized precoding matrix may be computed at the receiver. The quantized precoding matrix may be provided to the sender. The quantized precoding matrix may be included in the precoding information. The quantized precoding matrix may not need to maximize the mutual information of a particular receiver (e.g., of the parallel receiver). The quantized precoding may enhance (e.g., improve) the mutual information as compared to a case not applying any precoding.

The method may be further specified and/or comprise any further step as mentioned above or below.

According to a still further aspect, a computer program product is provided. The computer program product comprises portions of codes configured to implement the method as described herein when operated by respective processing units (e.g., of the devices mentioned herein). The computer program product can be stored on a computer readable medium. The computer-readable medium can be a permanent or rewritable memory. The computer-readable medium may be located within a user device or a network device or may be located externally.

According to another aspect, a device for precoding a signal to be transmitted over a physical channel from a sender to a receiver is provided. The device comprises a receiver unit adapted to receive precoding information by a feedback mechanism from the receiver; and an application unit adapted to apply a precoding matrix at the sender based on the precoding information resulting in a precoded signal for transmission over the physical channel, the precoding matrix enhancing mutual information at the receiver.

According to still another aspect, device for precoding a signal to be transmitted over a physical channel from a sender to a receiver is provided. The device comprises a feedback unit adapted to provide precoding information by a feedback mechanism to the sender; and a receiver unit adapted to receive from the sender over the physical channel a signal precoded by a precoding matrix based on the precoding information, the precoding matrix enhancing mutual information at the receiver.

According to a further aspect, a user equipment for a radio network is provided. At least one of the sender and the receiver may be integrated in the user equipment of the radio communications network.

According to a still further aspect, a radio access network device is provided. At least one of the sender and the receiver may be integrated in the radio access network device. The radio access network device may comprise a base station or an Evolved Node B (also referred to as eNodeB) of the radio communications network.

The radio communications network may comply with the Long Term Evolution (LTE) standard of the 3rd Generation Partnership Project (3GPP) or any other standard. One or both of the sender and the receiver may be a Multiple-Input and Multiple-Output sender (also referred to as MIMO sender) or a MIMO receiver, respectively.

Any one of the devices may be further specified and/or comprise any further feature as mentioned above or below in the context of a method aspect, and vice versa.

BRIEF DESCRIPTION OF THE DRAWINGS

Further aspects, advantages or features of the technique presented herein will become apparent from the following detailed description and the drawings, wherein.

DETAILED DESCRIPTION

In the following description, for purposes of explanation and not limitation, specific details are set forth (such as particular signal processing components and sequences of steps) in order to provide a thorough understanding of the present disclosure. It will be apparent to one skilled in the art that the techniques described herein may be practiced in other forms that depart from these specific details. For example, while certain examples will primarily be described in the context of Quadrature Amplitude Modulation (QAM), the present disclosure can also be applied to other modulation schemes. While certain examples will relate to an exemplary LTE implementation, it will be readily apparent that the techniques described herein may also be implemented in other communications networks such as LTE-Advanced networks.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in the context of methods and devices, the invention may also be embodied in a computer program product as well as in a system comprising a computer processor and a memory coupled to the processor, wherein the memory is encoded with one or more programs that may perform the services, functions and steps disclosed herein.

Figure 1:
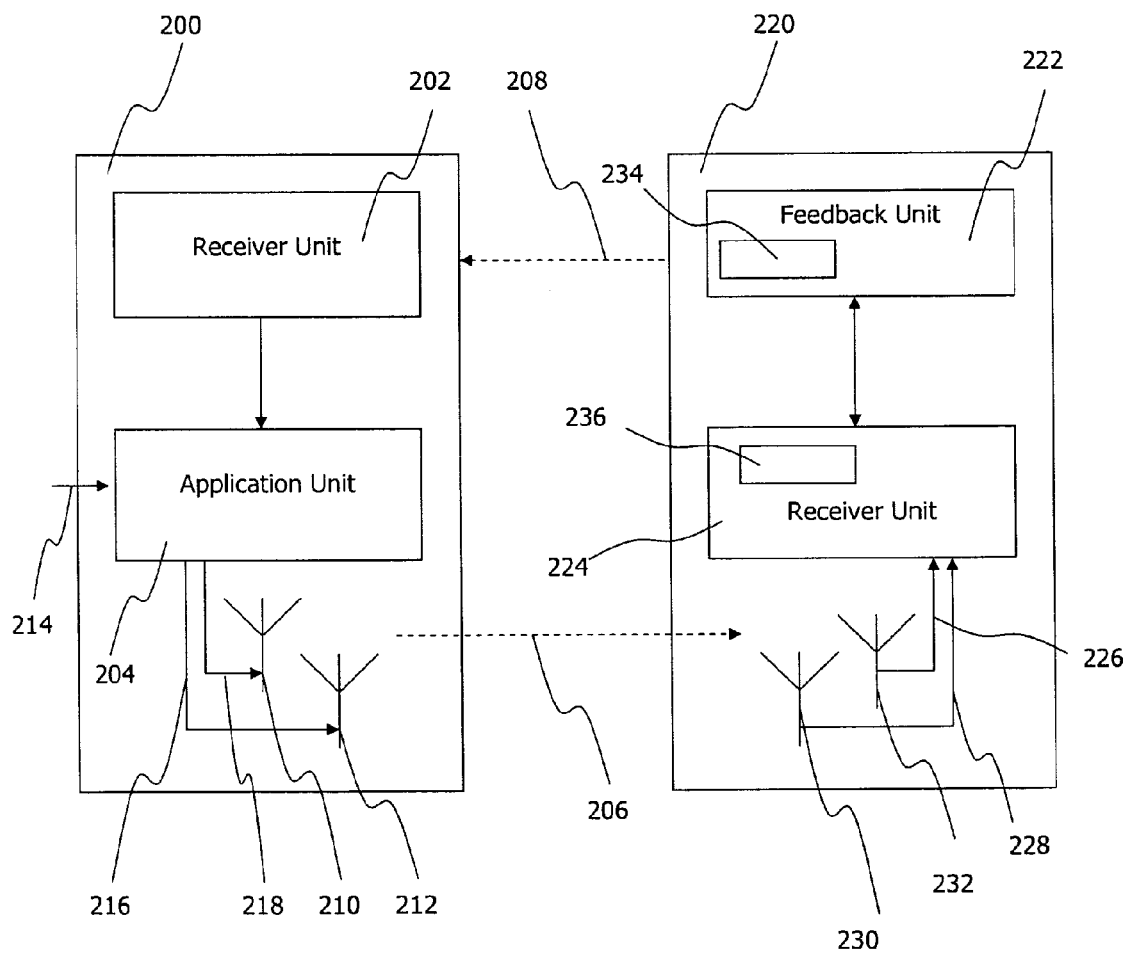
FIG. 1: shows a flow diagram according to a method embodiment for precoding a signal.

FIG. 1 schematically illustrates a block diagram of an embodiment of a device 200 for precoding a signal to be transmitted over a physical channel 206 from a sender to a receiver. The device 200 comprises a receiver unit 202 and an application unit 204. The receiver unit 202 is adapted to receive precoding information over a feedback channel 208. The application unit 204 is adapted to apply a precoding matrix W to a signal 214. The resulting precoded signals 216, 218 are output to the physical channel 206. The device 200 is located at a sender side.

The physical channel 206 comprises sending antennas 210, 212. Optionally, the sending antennas 210, 212 are comprised in the device 200.

FIG. 1 further schematically illustrates a block diagram of an embodiment of a device 220 for precoding a signal to be transmitted over a physical channel 206 from a sender to a receiver. The device 220 comprises a feedback unit 222 and a receiver unit 224. The feedback unit 222 is adapted to provide precoding information over a feedback channel 208 to the sender. The receiver unit 224 is adapted to receive signals 226, 228. The received signals have been precoded with a precoding matrix based on the precoding information. The precoding matrix is computed so as to maximize the mutual information at the receiver. The device 220 is located at a receiver side.

The physical channel 206 further comprises receiving antennas 230, 232. Optionally, the receiving antennas 230, 232 are comprised in the device 220.

In one embodiment, the feedback unit 222 further comprises a computation unit 234 adapted to compute the precoding matrix W based on the precoding information. The precoding matrix W is provided to both the sender over the feedback channel 208 and the receiving unit 224. The receiving unit 224 further comprises a decoding unit 236 adapted to decode the received signals 226, 228 based on the precoding matrix W.

Figure 2:
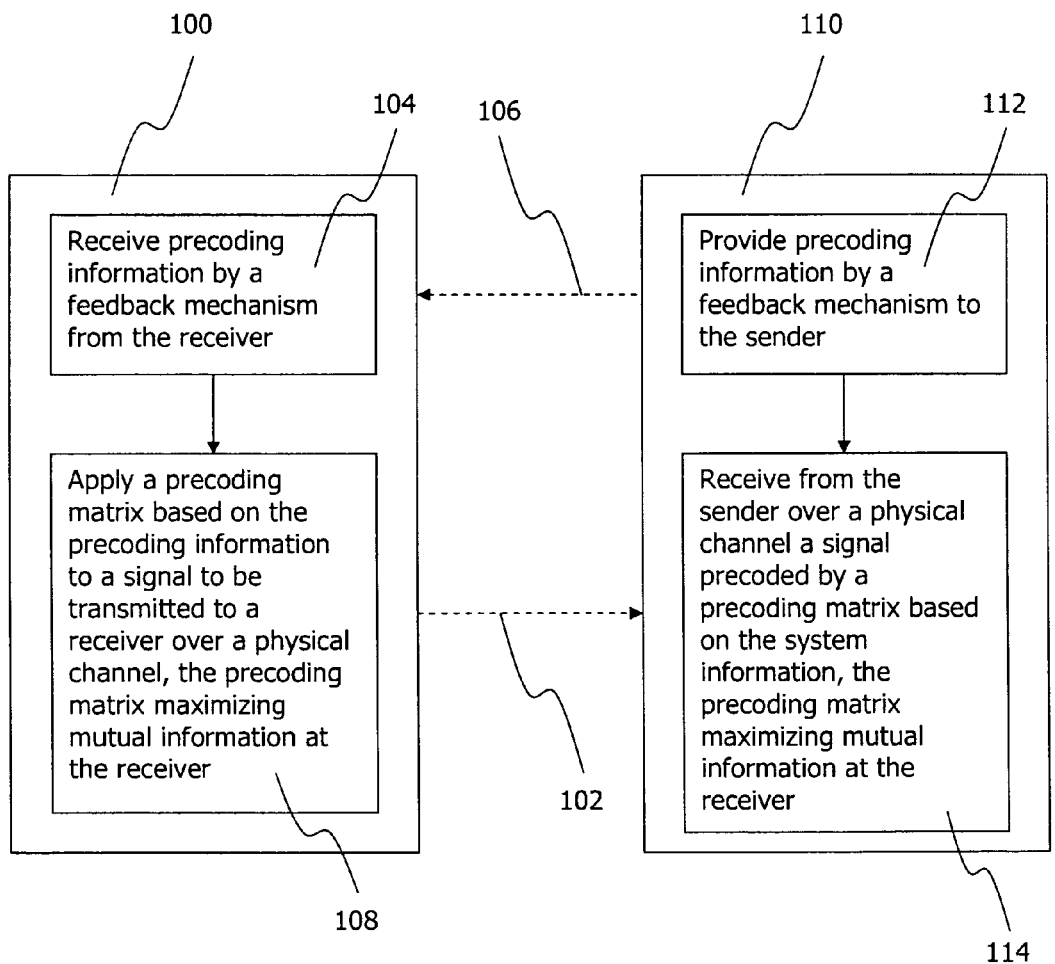
FIG. 2: schematically illustrates a device embodiment for precoding a signal adapted to perform the method shown FIG. 1.

FIG. 2 shows a flow diagram of an embodiment of a method 100 for precoding a signal to be transmitted over physical channel 102 from a sender to a receiver. The sender and receiver may be realized as illustrated in FIG. 1 for the device 200 and the device 220, respectively.

The method 100 is implemented at the sender side. In a step 104, precoding information is received at the sender side over a feedback channel 106. The precoding information is used in a step 108 of applying a precoding matrix W to a signal (shown with reference sign 214 in FIG. 1) that is to be transmitted over the physical channel. The precoding matrix W is computed to maximize mutual information I at the receiver side.

FIG. 2 further shows a flow diagram of an embodiment of a method 110 for precoding a signal to be transmitted over a physical channel 102 from the sender the a receiver. The method 110 is implemented at the receiver side. In a step 112, precoding information is provided over a feedback channel 106 to the sender. In a step 114, a signal (shown with reference signs 226, 228 in FIG. 2) is received. The received signal is precoded by a precoding matrix W. The precoding matrix W is computed so as to maximize mutual information I at the receiver side.

The step 114 may further include decoding the received signal based on the precoding information. A detection metric may be used in the decoding of the transmitted signal. The detection metric and the mutual information are defined in mutual consistency. In case the decoding metric is a conditional probability distribution, the mutual information is, e.g., defined in terms of the conditional probability distribution. The mutual information may involve a logarithm of the conditional probability distribution.

The following technical description provides further details on embodiments of the above methods and devices. Specifically, details on their implementation in the exemplary context of Multiple-Input-Multiple-Output transmission (or MIMO transmission) and MIMO systems are disclosed. In this context, necessary conditions for mutual information optimal linear precoding, in the context of a parallel layer MIMO detection scheme, are derived. The derivation exploits the fact that the mutual information of the parallel detection scheme can be expressed in terms of the mutual information associated with optimal maximum likelihood detection.

As used herein, the expression "mutual information optimal linear precoding" (or briefly "optimal precoding") encompasses a technique that determines the precoding matrix W by optimizing mutual information. Similarly, the expression "mutual information optimal maximum likelihood detection" may encompass that the technique allows for decoding by optimizing a given detection metric. The detection metric may thus be predefined. In that sense, the word "optimal" (in the context of using the detection metric) should not be confused with an "optimal" or "suboptimal" choice of the detection metric.

Results shown below indicate that in some embodiments, the high performance gap between parallel layer detection and maximum likelihood detection in ill conditioned channels can be alleviated by optimal precoding.

Multiple-input-multiple-output transmission constitutes a core component of many current wireless communication standards and is considered to be a key technique to increase spectral efficiency and transmission robustness. Seminal work on MIMO communication provided by I. Telatar, "Capacity of Multi-antenna Gaussian Channels," *European*

*Transactions on Telecommunications*, vol. 6, pp. 585-595, 1999, contemplated providing channel state information to the transmitter in order to increase the data rate especially for transmission over ill conditioned channels. In particular, Telatar showed that channel capacity can be achieved by transmitting Gaussian distributed signals along with linear precoding based on the channels singular value decomposition (SVD) and power allocation according to the (so-called) water-filling theorem. Existing wireless communication systems, however, employ finite transmit signal alphabets rather than Gaussian distributed signals for complexity reasons.

The mutual information maximizing linear preprocessing strategy associated with finite signal alphabets was, to best knowledge, not known until D. Guo, S. Shamai, and S. Verdú, "Mutual Information and Minimum Mean Square Error in Gaussian Channels," *IEEE Transactions on Information Theory*, vol. 51, pp. 1261-1282, 2005, described a fundamental relationship between the derivative of mutual information with respect to the Signal-to-Noise Ration (SNR) and the Minimum Mean Square Error (MMSE). Building on that work, A. Lozano, A. M. Tulino, and S. Verdú, "Optimum Power Allocation for Parallel Gaussian Channels with Arbitrary Input Distributions," *IEEE Transactions on Information Theory*, vol. 52, pp. 3033-3051, 2006 derived an optimal power allocation strategy for parallel channels, termed mercury/water filling (MWF). Parallelizing the MIMO channel by SVD based pre- and post-coding combined with MWF power allocation, however, has proven not to maximize Mutual Information (MI).

Necessary conditions, which have to be met by certain MI maximizing linear precoder, have been derived by D. P. Palomar and S. Verdú, "Gradient of Mutual Information in Linear Vector Gaussian Channels," *IEEE Transactions on Information Theory*, vol. 52, pp. 141-154, 2006 and in-depth discussed in F. Perez-Cruz, M. R. Rodrigues, and S. Verdú, "MIMO Gaussian Channels with Arbitrary Inputs: Optimal Precoding and Power Allocation," *IEEE Transactions on Information Theory*, vol. 56, to pp. 1070-1084, 2010, while M. Lamarca, "Linear Precoding for Mutual Information Maximization in MIMO Systems," in *IEEE International Symposium on Wireless Communication Systems*, 2009, derived the structure of the optimal precoder. Those results rely on the gradient of the MI w.r.t. the linear precoder and the MMSE which has been derived by Palomar and Verdú.

Above cited results of Palomar et al., Perez-Cruz et al., and Lamarca apply to systems, which employ optimal maximum likelihood detection (MLD). In particular, in per spatial layer coded systems, MLD can be implemented by means of successive cancelation detection. The successive cancelation detection requires serial processing of the spatial layers and thus may introduce a detection delay.

In the light of highly parallelized receivers structures, it appears beneficial to employ a suboptimal detection metric, which allows to detect the spatial layers in parallel, related to an abstract discussion of E. Ohlmer, U. Wachsmann, and G. Fettweis, "Mutual Information of MIMO Transmission over Correlated Channels with Finite Symbol Alphabets and Link Adaption," in *IEEE Global Communications Conference, accepted for publication*, 2010, and hence omits a detection delay. This suboptimal detection metric comes at the price of a rate loss and increased sensitivity to ill conditioned channels which could be mitigated by optimal linear preprocessing.

The present disclosure, inter alia, provides necessary conditions for the mutual information maximizing linear precoder associated with suboptimal parallel layer detection (PLD). A numerical example for an ill conditioned channel, described below, provides insight in what can be gained by optimal precoding as compared to existing techniques. Such existing techniques may include codebook based rank adaptive unitary precoding according to D. J. Love and R. W. H. Jr., "Limited Feedback Unitary Precoding for Spatial Multiplexing Systems," *IEEE Transactions on Information Theory*, vol. 51, pp. 2967-2975, 2005. Such existing techniques may further include codebook based rank adaptive unitary precoding according to "3GPP TS 36.211 V8.9.0: 3rd Generation Partnership Project; Technical Specification Group Radio Access Network; Evolved Universal Terrestrial Radio Access (E-UTRA); Physical Channels and Modulation (Release 8)," 3GPP, Tech. Rep. V.8.9.0, 2009. Such existing techniques may still further include SVD based precoding with mercury/waterfilling power allocation Lozano et al. and the unprecoded case.

The remainder of the disclosure, that may be realized, for example, in the context of the embodiments illustrated in FIGS. 1 and 2, is structured as follows. A general system description, which applies to both MLD and PLD, is provided with reference to FIG. 3, followed by a description of an embodiment in the context of optimal precoding for MLD. Subsequently, parallel detection is described and necessary conditions for an embodiment in the context of a mutual information maximizing linear precoder are derived. Numerical examples are provided.

As to notation, boldface uppercase, boldface lowercase and italic letters denote matrices, column vectors and scalar values, respectively. $a_i$; $I_N$, $(\bullet)^T$, $(\bullet)^H$ and $\delta(\bullet)$ denote the i-th element of vector a, the identity matrix of dimension N×N, the transpose and the Hermitian operator, and the Dirac delta function. $\|\bullet\|_2$, $|\bullet|$, $X_n \mathcal{A}_{n=1}^N$, $\nabla_A$ denote the vector-two norm, the absolute value or the cardinality of a set, the Cartesian product of sets $\mathcal{A}_n$ and the gradient w.r.t. matrix A. The symbols $p_a$ and $\mathbb{E}_a[\bullet]$ denote the probability density function (pdf) and the expectation w.r.t. random vector a. $\mathcal{CN}(\mu,\Sigma)$ denotes the complex Gaussian distribution with mean μ and covariance symbol Σ.

Figure 3:
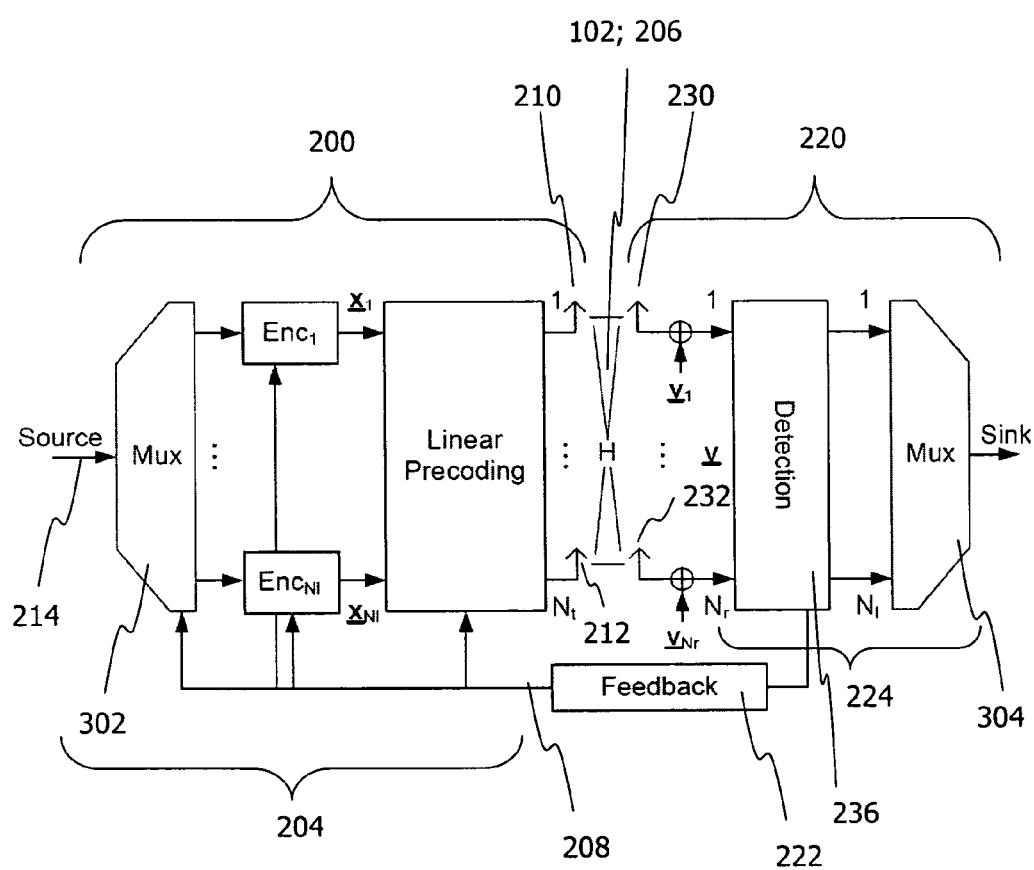
FIG. 3: schematically illustrates a block diagram of a data transmission system comprising the device embodiment of FIG. 2.

FIG. 3 schematically illustrates a block diagram of a data transmission system 300. More specifically, FIG. 3 shows a per spatial layer coded modulation MIMO system comprising $N_t$ sending antennas and $N_r$ receiving antennas (denoted $N_r \times N_t$). The system 300 comprises, or is formed of, the devices 200 and 220, as described above. The application unit 204 comprises a multiplexer 302 operative for multiplexing the source signal 214 to a plurality of spatial layers. Similarly, the receiver unit 224 comprises a multiplexer 304 operative for demultiplexing the plurality of spatial layers.

For a time discrete base band transmission, binary source data of the signal 214 is divided into $N_l$ data words for transmission on the $N_l$ spatial layers. On spatial layer l=1, . . . , $N_l$ the data word is mapped onto a transmit sequence $$\underline{x}_l = [x_l[1], \ldots x_l[K]] \in \mathcal{X}_l$$

by an encoding function with $\underline{x}=[\underline{x}_1, \ldots, \underline{x}_{N_l}]^T \in \mathcal{X}$ denoting the complete transmit block. Each symbol $x_l[k]$ is drawn from the set of modulation symbols $\mathcal{A}_l$, e.g. a M-QAM constellation with zero mean and average power constraint:

$$\mathbb{E}[|x_l[k]|^2] = \sigma_x^2$$

The vector symbol $$x[k] = [x_1[k], \ldots, x_{N_l}[k]]^T \in \mathcal{X} = X_{l=1}^{N_l} \mathcal{A}_l$$

(which is to be transmitted at time instant k=1, . . . , K) is assumed to be independently and identically distributed (i.i.d.) according to $$p_{x[k]} = \prod_{l=1}^{N_l} p_{x_l[k]} = \prod_{l=1}^{N_l} \frac{1}{|\mathcal{A}_l|} \sum_{x_l'[k] \in \mathcal{A}_l} \delta(x_l[k] - x_l'[k]). \quad (1)$$

The vector symbol x[k] is mapped onto the sending antennas by a linear precoding matrix $$W \in \mathbb{C}^{N_r \times N_l},$$

which is constant for a transmit block. The precoding matrix W is subject to a sum power constraint $$\mathbb{E}_x[tr(Wxx^H W^H)] = \sigma_x^2$$

and thus $$tr(WW^H) = 1$$

The precoded signal is transmitted over a block-static, narrow-band wireless channel $H \in \mathbb{C}^{N_r \times N_t}$ with $\mathbb{E}[H_{r,t}] = 0$ and $\mathbb{E}[|H_{r,t}|^2] = 1$. The received signal vector y[k] is obtained from the output of the wireless channel, as symbolically described by $$y[k] = HWx[k] + v[k] \quad (2)$$

wherein the additive receiver noise $v[k] \in \mathbb{C}^{N_r \times 1}$ is distributed according to $\mathcal{CN}(0, \sigma_v^2 I_{N_r})$.

The signal-to-noise-ratio (SNR) is accordingly defined as $SNR = \sigma_x^2/\sigma_v^2$. It is noted that one characteristic of the wireless channel may be its condition number κ. The condition number κ is the ratio of the channel's largest and smallest singular value, $\kappa = \gamma_{max}/\gamma_{min}$. For $\kappa \gg 1$, the channel is referred to as an ill conditioned channel. Otherwise, the channel is referred to as a well conditioned channel.

The method 110 performed at the receiver's side, i.e., by the device 220, are twofold. Firstly, the device 220 computes the precoding matrix, W, and the mutual information, I, per spatial layer. The precoding matrix W and the mutual information I are sent to the transmitter via an error free feedback channel. The channel is essentially without delay. More specifically, a derivation, or computation, may assume non-causal feedback, i.e., the receiver knows the channel realization of the next block and supplies the transmitter with feedback before the transmission of that block. This assumption applies, if the channel remains almost constant in between consecutive blocks, which is most often the case with real-world transmission.

Secondly, the device 220 aims at recovering the transmit block $\underline{x}$ given the observation $\underline{y} = [y[1], \ldots, y[k]]$ and perfect knowledge of the precoding matrix W and the channel state H. Knowledge of a result of the matrix product HW is also sufficient. The required transition probability density function (pdf) of the complete block decomposes into a product $$p_{\underline{y}|\underline{x},HW} = \prod_{k=1}^{K} p_{y[k]|x[k],HW}$$

since in most realistic implementations, the transmission is over an essentially memoryless channel. For the system according to Eq. (2), the transition pdf at time instant k results from the multi-variate Gaussian distribution:

$$p_{y[k]|x[k],HW} = \frac{1}{(\sigma_v^2 \pi)^{N_r}} \exp\left(-\frac{1}{\sigma_v^2} \|y[k] - HWx[k]\|_2^2\right) \quad (3)$$

In the following, for improving readability, the time index k and the conditioning on HW are intentionally omitted for the brevity of notation by writing x and $p_{(\cdot)}$ instead of x[k] and $p_{(\cdot|HW)}$, whenever the meaning is clear from the context.

Embodiments in the context of optimal precoding for maximum likelihood decoding (MLD) are described now. In this context, the decoding is also referred to as a detection. The MLD is associated with a certain mutual information. The necessary conditions on the mutual information maximizing linear precoder, as described below, allow uniquely relating precoding and decoding.

As to detection and mutual information, the mutual information optimal receiver strategy is to jointly decide for the transmitted sequences which maximize the posterior probability (cf. T. M. Cover and J. A. Thomas, *Elements of Information Theory*. Wiley-Interscience, 2006):

$$\hat{\underline{x}} = \arg\max_{\underline{x}' \in \underline{\mathcal{X}}} \{P(\underline{x} = \underline{x}' | \underline{y})\} = \arg\max_{\underline{x}' \in \underline{\mathcal{X}}} \left\{ \prod_{k=1}^{K} p_{y[k]|x[k]} \right\}. \quad (4)$$

For uniformly distributed transmit sequences, maximizing the pdf is equal to maximizing the transition pdf, as shown on the right hand side of Eq. (4). Thus, the MLD relies on the per vector symbol detection metric $$p_{y|x} = p_y \prod_{l=1}^{N_l} \frac{p_{y|x_1, \ldots, x_l}}{p_{y|x_1, \ldots, x_{l-1}}} \quad (5)$$

The mutual information of the MLD, using the expansion of the per vector symbol detection metric in Eq. (5), yields (cf. Cover et al.):

$$I(y;x)^{MLD} = \sum_{l=1}^{N_l} I(y; x_l | x_1, \ldots, x_{l-1}) \quad (6)$$

which is also referred to as the chain rule of mutual information. The notation, $I(\cdot)^{MLD}$ and $I(\cdot)^{PLD}$, explicitly distinguishes between the MI associated with the MLD and PLD detection schemes, respectively. An explicit evaluation of Eq. (6) for the Gaussian transition pdf in Eq. (3) is provided by, e.g., Ohlmer et al.

Keeping the "per spatial layer coding"-strategy in mind, Eq. (6) allows for an implementation by successive cancelation-detection steps: detect layer 1 in the presence of interference from all other layers, remove the interference of layer 1 from the received signal (conditioning on x1), detect layer 2, and so forth. This sequential processing of spatial layers however, comes at the price of a detection delay. As described further below in the context of PLD, a suboptimal detection metric may allow for parallel processing.

As to a precoding that maximizes Mutual Information (MI), the MI according to Eq. (6) is a function of the effective channel HW. The task is to derive the precoding matrix W, which maximizes the mutual information and ensures that a maximum transmit power constraint is met, which constrains can formally be written as $$W^o = \arg\max_{W} \{I(y;x)^{MLD}\}, \text{ s.t. } tr(WW^H) \leq 1. \quad (7)$$

The constrained optimization problem of Eq. (7) can be casted in terms of a Lagrangian function:

$$L(W,\mu) = -I(y;x)^{MLD} - \mu(1-tr(WW^H)) \quad (8)$$

with μ denoting a Lagrange multiplier. Any solution to Eq. (7) must meet the so-called Karush-Kuhn-Tucker (K.K.T.) conditions (cf. S. Boyd and L. Vandenberghe, *Convex Optimization*. Cambridge University Press, 2004):

$$\mu^o \geq 0 \quad (9a)$$

$$\mu^o(tr(W^o W^{oH}) - 1) = 0 \quad (9b)$$

$$\nabla_w L(W^o, \mu^o) = 0. \quad (9c)$$

It is noted that the K.K.T. conditions are necessary, but not sufficient, since the mutual information is generally not convex in W, as discussed by M. Payaro and D. P. Palomar, "Hessian and Concavity of Mutual Information, Differential Entropy, and Entropy Power in Linear Vector Gaussian Channels," *IEEE Transactions on Information Theory*, vol. 55, pp. 3613-3628, 2009.

Solving (9c) requires the gradient of the MI w.r.t. the precoder, which yields (cf. Palomar et al.):

$$\nabla_w I(y;x)^{MLD} = 1/\sigma_v^2 H^H H W E \quad (10)$$

with E denoting the mean square error (MSE) matrix associated with the estimate $E_x[x|y]$ (termed MMSE matrix):

$$E = \mathbb{E}_{y,x}\left[(x - \mathbb{E}_x[x|y])(x - \mathbb{E}_x[x|y])^H\right]. \quad (11)$$

Combining above results, the necessary condition for the optimal precoder can be explicitly stated as (cf. Perez-Cruz et al.):

$$W^o = \frac{1}{\|H^H H W^o E\|_2} H^H H W^o E. \quad (12)$$

In what follows, embodiments are described in the context of optimal precoding for parallel layer detection (PLD). As to detection and mutual information, the sequential signal processing steps, required to implement successive cancelation detection in case of MLD can be undesirable for at least a receiver implementation, as pointed out above. Sequential processing can be circumvented by replacing the optimal per vector symbol detection metric, $p_{y|x}$, by a suboptimal one, $\Pi_l p_{y|x_l}$, which does not require interference cancelation (e.g., by means of statistical conditioning) of already detected layers. The suboptimal detection metric corresponds to the detection metric of Eq. (5) except for discarding any conditioning on layers 1, . . . , l−1. For the suboptimal (and parallel) metric, the detection problem can be formally written as $$\hat{x} = \underset{x' \in \mathcal{X}}{\operatorname{argmax}}\left\{\prod_{k=1}^{K}\prod_{l=1}^{N_1} p_{y[k]|x_1[k]}\right\} \to \hat{x}_1 = \underset{x'_1 \in \mathcal{X}_1}{\operatorname{arg\,max}}\left\{\prod_{k=1}^{K} p_{y[k]|x_1[k]}\right\}, \quad (13)$$

$$\hat{x}_2 = \ldots ,$$

which shows that the problem of detecting $\underline{x}$ jointly, decomposes into a parallel detection of the $N_l$ spatial layers. The MI, which is associated with parallel detection, is given by $$I(y;x)^{PLD} = \sum_{l=1}^{N_l} I(y;x_l) \leq I(y;x)^{MLD} \quad (14)$$

The inequality on the right hand side of Eq. (14) holds, since conditioning reduces uncertainty (cf. Cover et al.). An explicit evaluation of Eq. (14) is provided by Ohlmer et al.

As to a corresponding precoding that maximizes the mutual information, the optimization problem of finding the mutual information maximizing precoder for PLD can be formulated similar to the MLD by replacing $I(y;x)^{MLD}$ in Eqs. (7), (8) and (9) by $I(y;x)^{PLD}$.

The PLD treats the MIMO transmission as a transmission over a set of parallel channels. Each channel, $x_l \to y$, is disturbed by additive white Gaussian noise (AWGN) and non-Gaussian interference from the remaining $N_l - 1$ spatial layers. Hence, fundamental results according to Palomar et al., which apply to linear channels with additive Gaussian disturbance, cannot be applied here. Particularly, the results of Palomar et al. do not allow directly computing the gradient $\nabla_w I(y;x)^{PLD}$.

In order to determine the corresponding precoding matrix W, one may return to the definition of I(y; xl) (cf. Ohlmer et al.):

$$I(y;x_l) = \mathbb{E}_{y,x_l}\left[\log_2\left(\frac{p_{y|x_l}}{p_y}\right)\right] \quad (15)$$

$$= \mathbb{E}_{y,x_l}\left[\log_2\left(\frac{\sum_{x^{l'} \in \mathcal{X}^l} p_{y|x^l = x^{l'}, x_l}}{\frac{1}{|A_l|}\sum_{x' \in \mathcal{X}} p_{y|x}}\right)\right] \quad (16)$$

wherein $\bar{x}^l$ denotes the transmit vector, x, except the l-th element, and $\mathcal{X}^l$ denotes the respective set. By inserting the factor of unity, $$\frac{\frac{1}{\prod_{t \neq l} |A_t|} p_{y|x^l = x^{l'}, x_l}}{\frac{1}{\prod_{t \neq l} |A_t|} p_{y|x^l = x^{l'}, x_l}}$$

into the argument of the logarithm in Eq. (16), an equivalent expression reads:

$$I(y;x_l) = \underbrace{\mathbb{E}_{y,x_l}\left[\log_2\left(\frac{\frac{1}{\prod_{t \neq l}|A_t|}\sum_{x^{l'} \in \mathcal{X}^l} p_{y|x^l = x^{l'}, x_l}}{p_{y|x}}\right)\right]}_{-I(y;x|x_l)} + \quad (17)$$

$$\underbrace{\mathbb{E}_{y,x_l}\left[\log_2\left(\frac{p_{y|x}}{\frac{1}{|\mathcal{X}|}\sum_{x' \in \mathcal{X}} p_{y|x=x'}}\right)\right]}_{I(y;x)}.$$

It is remarked that A. Fàbregas and A. Martinez, "Derivative of BICM mutual information," *Electronics Letters*, vol. 43, no. 22, October 2007, used a related symbolic manipulation for obtaining a derivative of BICM-MI in a SISO channel, based on a representation of the BICM-MI by the coded modulation MI (also cf. A. Martinez, A. G. i Fàbregas, G. Caire, and F. M. J. Willems, "Bit-Interleaved Coded Modulation in the Wideband Regime," *IEEE Transactions on Information Theory*, vol. 54, pp. 5447-5455, 2008).

Summarizing Eq. (17), one finds:

$$I(y; x)^{PLD} = \sum_{l=1}^{N_l} I(y; x)^{MLD} - I(y; x|x_l)^{MLD} \quad (18)$$

Eq. (18) above shows that, and how, the MI in the case of PLD is representable by a difference between MI in the case of MLD and an MI corresponding to MLD given that the l-th channel input is known at the receiver. Since the l-th channel input is already known, it neither contributes to the mutual information nor to the MMSE in estimating x from y. This is equivalent to a system, which does not use the l-th channel input at all. Consequently, it could be equivalently set to be zero. This shall be denoted by $x_{x_l}=0$.

Both MI terms on the right hand side of Eq. (18) describe the transmission over a linear channel with Gaussian disturbance. Based on that, one may now obtain the gradient w.r.t W using an intermediate result of Palomar et al.:

$$\nabla_W I(y; x)^{PLD} = \sum_{l=1}^{N_l} \nabla_W I(y; x)^{MLD} - \nabla_W I(y; x_{x_l=0})^{MLD} \quad (19)$$

$$= \frac{1}{\sigma_v^2} H^H HW \left( \sum_{l=1}^{N_l} E - E_l \right) \quad (20)$$

In Eq. (20), El is defined as in Eq. (11) except that the l-th channel input is not used. In other words, the l-th channel is set to be zero. Eq. (20) shows that the conditions for the optimal precoder associated with PLD exhibit a similar structure as compared to the MLD (c.f. Eq. (10)), whereas the expressions, including the solution for implementing the computation of the precoding matrix W, differ in the computation of the MMSE matrix.

Figure 4:
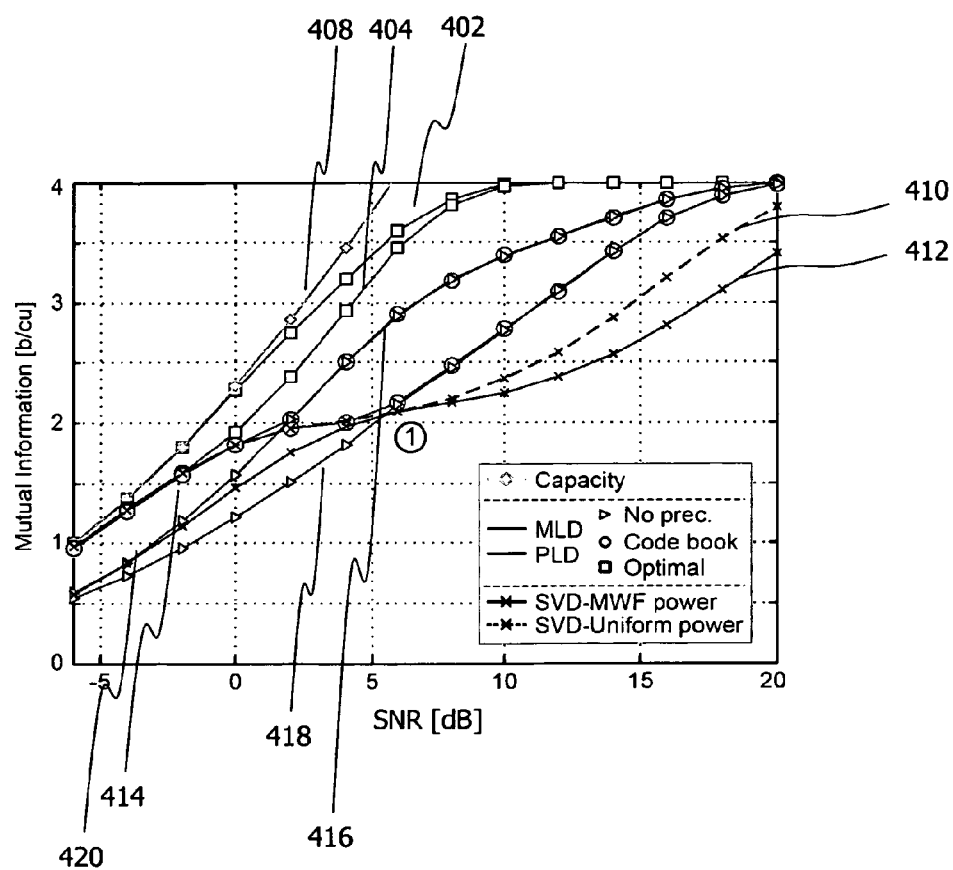
FIG. 4: shows a diagram indicating Mutual Information versus Signal-to-Noise ratio for 4-QAM and different precoding strategies.
Figure 5:
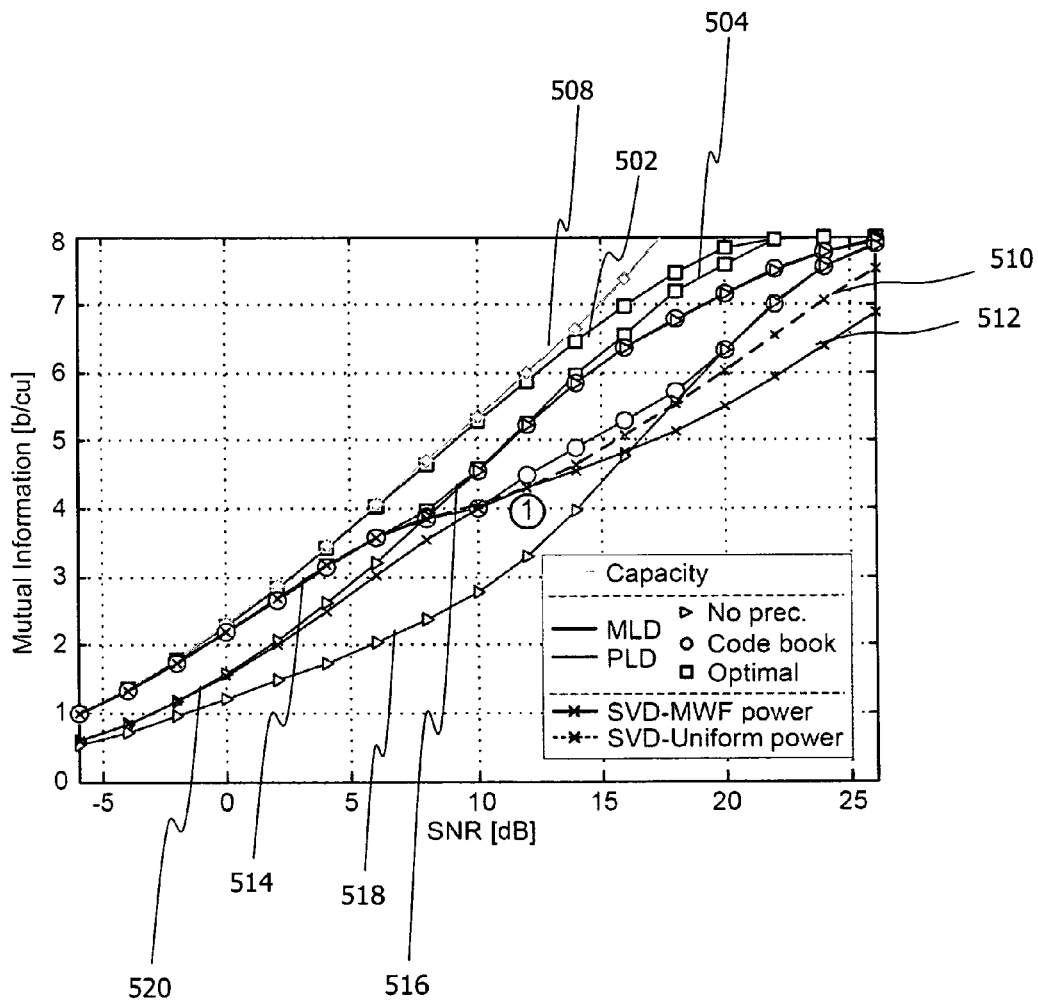
FIG. 5: shows a diagram indicating Mutual Information versus Signal-to-Noise Ratio (SNR) for 16-QAM and different precoding strategies.

Explicit numerical implementations of the technique are provided with reference to FIGS. 4 and 5, which compare different precoding strategies for MLD and PLD. More specifically, FIG. 4 shows results for the mutual information in a 2×2 MIMO transmission using 4-QAM, and FIG. 5 shows results for the mutual information in a 2×2 MIMO transmission using 16-QAM.

The transmission of 4-QAM and 16-QAM modulated signals is numerically investigated over an ill conditioned 2×2-MIMO channel:

$$H = \begin{pmatrix} 1 & 1 \\ 1 & e^{j\pi/8} \end{pmatrix}, \lambda_1 \approx 1.99, \lambda_2 \approx 0.2, \kappa \approx 20 \text{ dB}. \quad (21)$$

The optimal precoder is iteratively computed using the gradient-based approach (cf. Palomar at al.):

$$W_{i+1} = \alpha_{i+1} \underbrace{\left( W_i + \beta \frac{1}{\sigma_v^2} H^H H W_i E_i \right)}_{W'_{k+1}} \quad (22)$$

with β denoting the step size, and E being defined as in Eq. (11) for the case of MLD, or E being replaced by the sum $\Sigma_l E-E_l$ as in Eq. (20) for the case of PLD.

In Eq. (22), setting $$\alpha_{i+1} = \sqrt{1/tr(W'_{i+1} W'_{i+1}{}^H)}$$

ensures the feasibility of the solution in the i-th iteration step. The iterative search is carried out for a number of initial precoding matrices $W_0$ in order to cope with the non-convexity of the optimization problem. However, the resulting rates obtained from the iteration should be viewed as a lower bound, since it cannot be guaranteed that the globally optimal precoder is found. Diagrams 400 and 500 in FIGS. 4 and 5, respectively, show the results for the mutual information versus SNR. The result 402 and 502 for MLD, and the result 404 and 504 for PLD, are compared to (i) channel capacity including water-filling power allocation, shown with reference sign 408 and 508;
(ii) the MI obtained from diagonalizing the MIMO channel by SVD based pre- and postcoding along with uniform (reference signs 410 and 510) and optimal MWF power allocation (reference sign 412 and 512, cf. Lozano et al.);
(iii) codebook based rank adaptive unitary precoding using the codebook proposed in 3GPP TS 36.211 V8.9.0 (reference sign 414 and 416, as well as 514 and 516); and
(iv) a transmission without precoding (reference sign 418 and 420, as well as 518 and 520).

Without precoding, we observe a high SNR loss of PLD compared to MLD. Optimal precoding alleviates that loss. Additionally, it can be observed, that MLD with optimal precoding performs very close to channel capacity in the low to medium SNR regime, which indicates that the precoder, found by the iterative search must be close to the optimal precoder.

Figure 6:
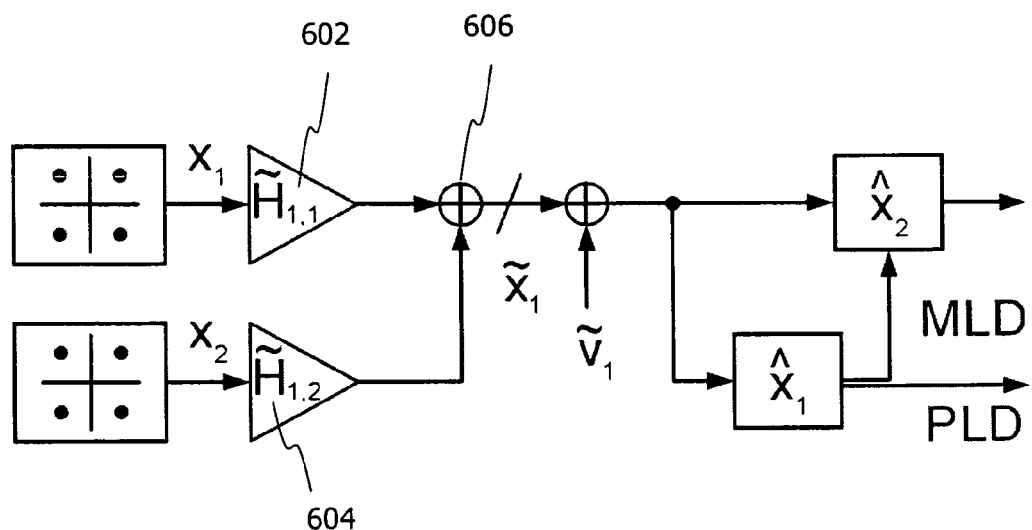
FIG. 6: shows a block diagram for an effective Multiple-Input Single-Output (MISO) transmission over the larger singular value in the low SNR regime.

In order to gain a deeper insight into the optimal precoding implementation, the transmission over the effective channel $$\tilde{y}=U^H y=\tilde{H}x+\tilde{v} \text{ with } \tilde{H}=SV^H W^o$$

is further investigated for 4-QAM. In the low SNR regime, the second row of $\tilde{H}$ (as a matrix representation of the channel state) is almost equal to zero. In other words, only the large singular value is used for transmission (in both cases PLD and MLD). Hence, the transmission can effectively be represented by a block diagram 600 shown in FIG. 6. Both input signals $x_1$ and $x_2$ are weighted in stages 602 and 604, respectively, and superimposed in stage 606, yielding an effective transmit signal $\tilde{x}_1$. The precoder, i.e. the determination of the precoding matrix, can control the contribution of both inputs via $\tilde{H}_{1,1}$ and $\tilde{H}_{1,2}$. As results:

1) $\tilde{x}_1$ can be viewed as if it was drawn from a larger symbol alphabet than $x_1$ or $x_2$; and
2) $\tilde{x}_1$ contains two independently encoded symbol levels. At the device 220, $\tilde{x}_1$ serves as side information for detecting $x_2$ for the case of MLD, while the PLD realizes detection without side information.

Figure 7:
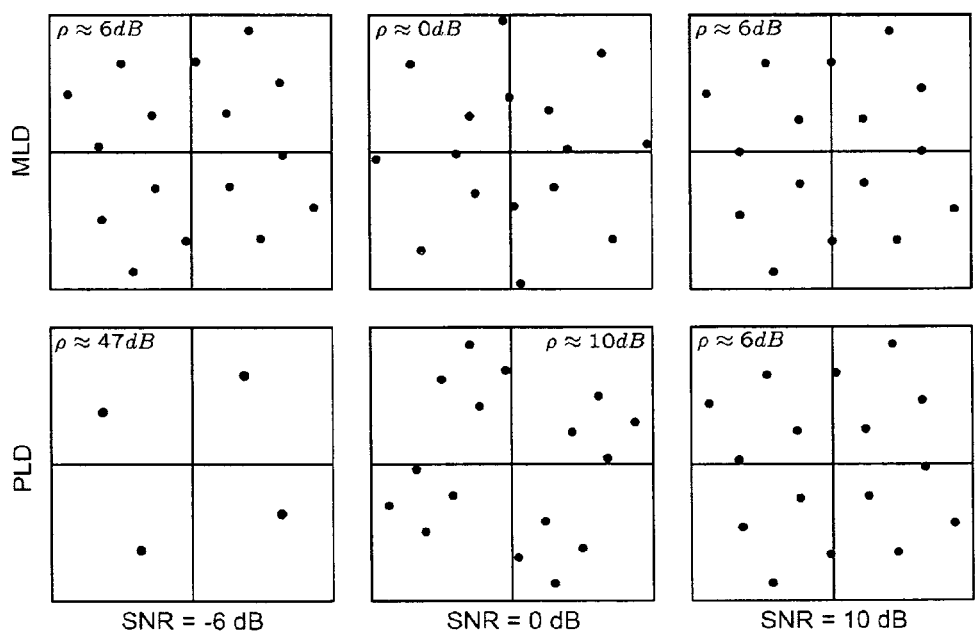
FIG. 7: shows an effective transmit symbol constellation.

An effective transmit alphabet 700 of $\tilde{x}_1$ is shown in FIG. 7 for MLD and PLD in the upper and lower row, respectively. We define $$\rho=10 \log_{10}(|\tilde{H}_{1,1}|/|\tilde{H}_{1,2}|)$$

to measure how $x_1$ and $x_2$ contribute to $\tilde{x}_1$.

In case of the PLD, it can be seen that the contribution of $x_2$ increases with increasing SNR. In the very low SNR regime, solely $x_1$ is employed for transmission. As soon increased, such that effectively a larger constellation, with independently encoded symbol levels is transmitted. It was observed that in case of MLD (cf. FIG. 4 in the publication of Lamarca), more channel inputs contribute at a lower SNR as compared to the PLD.

Based on the results (1) and (2), the following precoder structure is considered in terms of a matrix product $$W = V^H PM. \quad (23)$$

$V^H$ aims at compensating V. The matrix P is a diagonal matrix, which allocates power to the singular values. M is a mixing matrix, which allows mapping a superposition of the different channel inputs to a particular singular value. More specifically, the following structure is set forth for a transmission employing two sending antennas 210, 212.

$$P = \begin{bmatrix} p & 0 \\ 0 & \sqrt{(1-p^2)} \end{bmatrix}, \; p \in [0;1], \quad (24)$$

$$M = \begin{bmatrix} m_1 & \sqrt{1-m_1^2}\, e^{j\phi_1} \\ \sqrt{1-m_2^2}\, e^{j\phi_2} & m_2 \end{bmatrix},$$

$$m_{1,2} \in [0;1]$$

$$\phi_{1,2} \in [0; 2\pi]$$

The phase rotation $\phi_{1,2}$ shall ensure that close distances between signal points within the superimposed constellation (e.g. $m_1 x_1 + \sqrt{(1-m_1^2)} e^{j\phi_1} x_2$) are omitted.

In order to turn the computation of W into a selection, the implementation allows only precoding matrices from the codebook $\mathcal{W}$. The entries contained in $\mathcal{W}$ are derived next, based on the above stated structure.

V is allowed to take values from the codebook $\mathcal{V}$ of unitary matrices. An example on how to compute such a codebook is given in, e.g., by M. A. Sadrabadi, A. K. Khandani, and F. Lahouti, "A New Method of Channel Feedback Quantization for High Data Rate MIMO Systems," in *IEEE Global Communications Conference*, 2004. The numbers p, $m_{1,2}$, $\phi_{1,2}$ are allowed to take any value from the codebooks $\mathcal{P}$, $\mathcal{M}_{1,2}$, $\Phi_{1,2}$. The codebook for $\mathcal{W}$ is hence a collection of the codebooks $\mathcal{P}$, $\mathcal{M}_{1,2}$, $\Phi_{1,2}$ and contains $$|\mathcal{W}| = |\mathcal{V}| \times |\mathcal{P}| \times |\mathcal{M}_1| \times |\mathcal{M}_2| \times |\Phi_1| \times |\Phi_2|$$

entries. It thus requires $\log_2 |\mathcal{W}|$ bit to index all entries.

The selection of a certain codebook entry can be implemented in two steps as follows:

(a) selecting the $V^{oH}$, which minimizes the squared sum over the non diagonal elements of $VV^{oH}$ (chosen since the goal of that operation is $VV^{Ho} = I$); and (b) given $V^{oH}$ selected in step (a), jointly selecting the parameters $p_{1,2}$, $m_{1,2}$, $\phi_{1,2}$ such that the mutual information is maximized. Symbolically:

$$\{p_{1,2}^o, m_{1,2}^o, \phi_{1,2}^o\} = \arg\max_{p_{1,2}, m_{1,2}, \phi_{1,2}} \{I(y; x \mid HW(p_{1,2}, m_{1,2}, \phi_{1,2}))^{Rx}\} \quad (25)$$

wherein $I(\bullet)^{Rx}$ denotes the mutual information that is associated (or coupled) to the particular receiver, e.g. MLD or PLD.

The two step selection procedure has the inherent advantage that the computational challenging task of computing the mutual information needs only be carried out for a subset of W after a number of entries have already been discarded by the selection of V o H.

Figure 8:
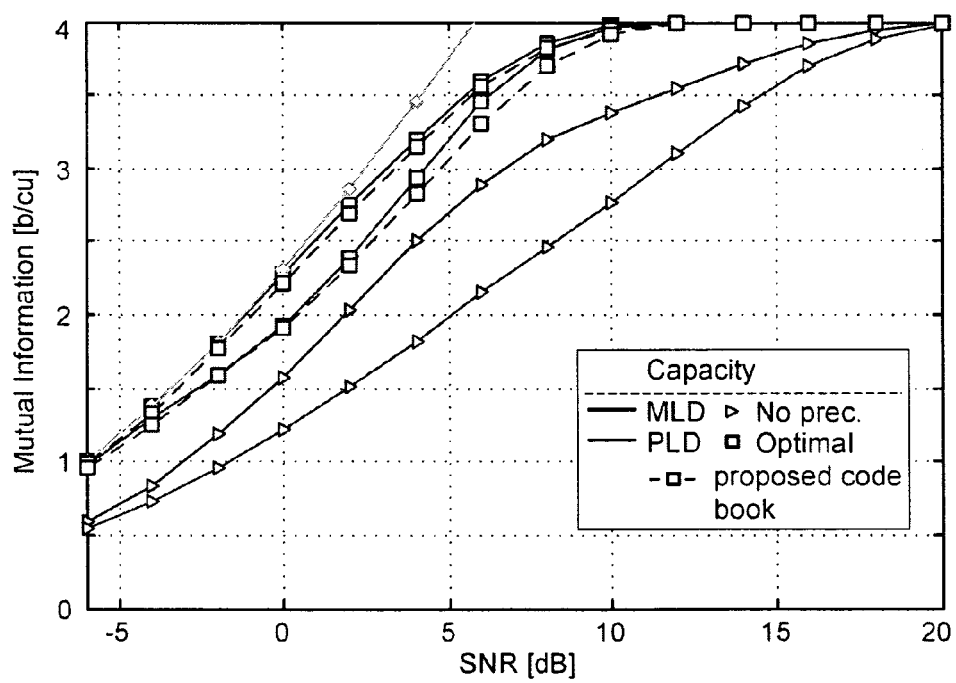
FIG. 8: shows a diagram indicating Mutual Information versus SNR for 4-QAM and a codebook.

Next, it is shown that a relatively small codebook $\mathcal{W}$ suffices to get close to the mutual information maximizing results. Assume the following example: $p^2$, $m_1 = m_2 = m \in \{1, \frac{7}{8}, \frac{3}{4}, \frac{1}{2}\}$, which requires 4 bit and $|\mathcal{V}| = 64$, which requires 6 bit. The codebook V is obtained from the space of unitary matrices by a numerical vector quantization algorithm. A numerical example of the corresponding codebook performance is shown in diagram 800 of FIG. 8. The mutual information that is obtained from the codebook is only marginally less than the mutual information obtained from the optimal precoder.

The technique presented herein can provide certain advantages over existing devices, methods or systems. In the context of above embodiments of methods and devices for precoding a signal to be transmitted over a physical channel, necessary conditions for mutual information maximizing precoding have been derived. In some embodiments, an effective data rate is higher, or adapts faster to varying channel states resulting in a higher average data rate. In some embodiments, reliability or stability of the transmission can be improved by adjusting the precoding to varying channel states. For a parallel MIMO detection scheme, a delay in the decoding can be avoided. The embodiments for PLD exploit a relationship between the gradient of the mutual information and at least one of the MMSE matrix and the MSE matrix. The conditions derived were found to differ from the existing techniques associated with the MLD by the definition of at least one of the MMSE matrix and the MSE matrix. It was shown that optimal precoding can alleviate the performance gap between PLD and MLD in ill conditioned channels.

The mutual information that is obtained from the optimal precoder can serve as a benchmark to compare any suboptimal precoding scheme, e.g. codebook based precoding in combination with the particular MIMO detection scheme. The present precoding technique, based on the necessary conditions for the optimal precoder, can be extended to other suboptimal MIMO detections schemes, such as linear detection.

While the technique presented herein has been described in relation to exemplary embodiments, it is to be understood that this description is for illustrative purposes only. Accordingly, it is intended that the invention be limited only by the scope of the claims appended hereto.

The invention claimed is:

1. A method of precoding a signal to be transmitted over a physical channel from a sender to a receiver, the method comprising:
   receiving precoding information by a feedback mechanism from the receiver;
   applying a precoding matrix (W) at the sender based on the precoding information to generate a precoded signal for transmission over the physical channel, the precoding matrix configured for a detection based on an estimation error and enhancing mutual information (I) at the receiver, wherein a covariance (E) of the estimation error is related to a gradient of the mutual information with respect to the precoding matrix by a relation,
   wherein the relation is employed for computing the precoding matrix.

2. The method of claim 1, wherein the precoding information comprises at least one of: system information and the mutual information.

3. The method of claim 2, wherein the system information comprises at least one of: a state (H) of the physical channel, statistics of the signal, and statistics of noise.

4. The method of claim 2:
   wherein the signal comprises a plurality of symbols out of a symbol alphabet transmitted in a data block;
   wherein the system information comprises a probability distribution for the data block.

5. The method of claim 2, wherein the system information comprises statistical information about at least one of additive noise caused by interference with another radio signal and additive receiver noise.

6. The method of claim 1, wherein the precoding matrix is determined at the sender based on the precoding information.

7. The method of claim 1:
wherein the physical channel comprises a plurality of sending antennas;
wherein the signal comprises a plurality of payload signals;
wherein the application of the precoding matrix includes mapping the plurality of payload signals to the sending antennas by means of the precoding matrix.

8. The method of claim 1, wherein the precoding matrix is computed in accordance with a maximum likelihood estimator.

9. The method of claim 1, wherein the physical channel comprises a plurality of spatial layers that are successively detectable by removing interference of a detected layer from a transmitted signal.

10. The method of claim 1:
wherein the physical channel comprises a plurality of spatial layers;
wherein the precoding matrix is computed in accordance with a suboptimal detection metric that decomposes in accordance with the plurality of spatial layers.

11. The method of claim 10, wherein at least one of the suboptimal detection metric and the mutual information is representable by a product or a sum over the plurality of spatial layers.

12. The method of claim 10, further comprising computing at least one of the mutual information per spatial layer and a gradient thereof with respect to the precoding matrix.

13. The method of claim 12, further comprising determining the precoding matrix based on a relationship between the gradient of the mutual information and at least one of a Minimum Mean Square Error estimator and a Mean Square Error matrix.

14. The method of claim 13, wherein the determining the precoding matrix comprises determining a Mean Square Error matrix ($E_l$) that is independent of the l-th physical layer.

15. The method of claim 14, wherein the gradient of the mutual information is computed in accordance with:

$$\nabla_W \stackrel{PLD}{I}(y; x) = \frac{1}{\sigma_v^2} H^H H W \left( \sum_{l=1}^{N_t} E - E_l \right)$$

where:
x denotes a transmitted signal;
y denotes a received signal;
PLD denotes Parallel Layer Detection;
$\sigma_v^2$ denotes noise variance;
H denotes channel state
$N_t$ denotes a number of transmit antennas.

16. The method of claim 10, wherein the precoding matrix allows for parallel decoding of the precoded signal at the receiver.

17. The method of claim 10:
wherein the signal comprises a payload signal on each of the spatial layers;
wherein the precoding matrix allows for independently decoding the plurality of payload signals.

18. The method of claim 1, wherein the physical channel comprises at least one of a plurality of sending antennas at the sender and a plurality of receiving antennas at the receiver.

19. The method of claim 18, wherein the precoding matrix represents a beamforming matrix.

20. The method of claim 1:
wherein the transmission includes a plurality of physical channels, each exhibiting a channel state;
wherein for each channel state a dedicated precoding matrix is determined and applied for the transmission.

21. The method of claim 20:
wherein the physical channel includes an OFDM channel;
wherein the plurality of channel states is associated to a plurality of sub-carriers of the OFDM channel.

22. The method of claim 1:
wherein the signal comprises a plurality of symbols out of a symbol alphabet;
wherein the precoding information relates to the symbol alphabet.

23. The method of claim 1, wherein the precoding matrix is selected from an arbitrary codebook or predefined codebook.

24. The method of claim 23, wherein the codebook is a set of different precoding matrices.

25. The method of claim 23, wherein mutual information is maximized within the codebook.

26. The method of claim 23, wherein the precoding matrix is selected from the codebook by comparison with an optimal precoding matrix.

27. The method of claim 23:
wherein a channel state (H) of the physical channel is decomposed using a unitary matrix;
wherein the precoding matrix depends on the unitary matrix.

28. The method of claim 27, wherein the codebook is a structured codebook optimized for the selection.

29. The method of claim 23, wherein the precoding matrix is quantized and the precoding information includes the quantized precoding matrix.

30. A method of precoding a signal to be transmitted over a physical channel from a sender to a receiver, the method comprising:
providing precoding information via a feedback mechanism to the sender, wherein a precoding matrix (W) is computed at the receiver and configured for a detection based on an estimation error and enhancing mutual information (I) at the receiver, wherein a covariance (E) of the estimation error is related to a gradient of the mutual information with respect to the precoding matrix by a relation, the relation being employed for computing the precoding matrix,
wherein the precoding information comprises the precoding matrix;
receiving, from the sender and over the physical channel, a signal precoded by the precoding matrix based on the precoding information.

31. The method of claim 30 wherein the precoding information comprises at least one of: system information and the mutual information.

32. The method of claim 30:
wherein the physical channel comprises a plurality of spatial layers;
wherein the precoding matrix is computed in accordance with a suboptimal detection metric that decomposes in accordance with the plurality of spatial layers.

33. A computer program product stored in a non-transitory computer readable medium for precoding a signal to be transmitted over a physical channel from a sender to a receiver, the computer program product comprising software instructions which, when run on one or more computing devices, causes the one or more computing devices to:

receive precoding information by a feedback mechanism from the receiver;

apply a precoding matrix at the sender based on the precoding information to generate a precoded signal for transmission over the physical channel, the precoding matrix configured for a detection based on an estimation error and enhancing mutual information at the receiver, wherein a covariance of the estimation error is related to a gradient of the mutual information with respect to the precoding matrix by a relation, wherein the relation is employed for computing the precoding matrix.

34. A device for precoding a signal to be transmitted over a physical channel from a sender to a receiver, the device comprising:

a receiver unit configured to receive precoding information by a feedback mechanism from the receiver;

an application unit configured to apply a precoding matrix at the sender based on the precoding information resulting in a precoded signal for transmission over the physical channel, the precoding matrix being configured for a detection based on an estimation error and enhancing mutual information at the receiver, wherein a covariance of the estimation error is related to a gradient of the mutual information with respect to the precoding matrix, wherein the relation is employed for computing the precoding matrix.

35. The device of claim 34, wherein the device comprises a portion of a user equipment of a radio network.

36. The device of claim 34, wherein the device comprises a portion of a radio access network device of a radio network.

37. A device for precoding a signal to be transmitted over a physical channel from a sender to a receiver, the device comprising:

a feedback unit configured to provide precoding information via a feedback mechanism to the sender, wherein a precoding matrix is computed at the receiver and configured for a detection based on an estimation error and enhancing mutual information at the receiver, wherein a covariance of the estimation error is related to a gradient of the mutual information with respect to the precoding matrix by a relation, wherein the relation is employed for computing the precoding matrix, wherein the precoding information comprises the precoding matrix;

a receiver unit configured to receive, from the sender and over the physical channel, a signal precoded by the precoding matrix based on the precoding information.

38. The device of claim 37, wherein the device comprises a portion of a user equipment of a radio network.

39. The device of claim 37, wherein the device comprises a portion of a radio access network device of a radio network.

* * * * *